(12) United States Patent
Gripemark et al.

(10) Patent No.: US 7,353,917 B2
(45) Date of Patent: Apr. 8, 2008

(54) POSITIONING OF A BRAKE CALIPER

(75) Inventors: Joakim Gripemark, Helsingborg (SE); Patrik Kall, Helsingborg (SE); Goran Stensson, Brosarp (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 11/262,845

(22) Filed: Oct. 31, 2005

(65) Prior Publication Data

US 2006/0113152 A1    Jun. 1, 2006

Related U.S. Application Data

(63) Continuation of application No. PCT/SE2004/000646, filed on Apr. 27, 2004.

(30) Foreign Application Priority Data

Apr. 29, 2003    (SE) .................................. 0301249

(51) Int. Cl.
    *B60T 1/06* (2006.01)
(52) U.S. Cl. .................................... 188/18 A; 188/72.2
(58) Field of Classification Search ............... 188/72.2, 188/18 A, 71.5, 73.31, 17, 71.1
    See application file for complete search history.

(56) References Cited

U.S. PATENT DOCUMENTS 5,775,782 A * 7/1998 Akita et al. ................. 188/72.2

7,188,711 B2 * 3/2007 Gripemark et al. ...... 188/73.31

FOREIGN PATENT DOCUMENTS

| EP | 1 122 162 A | 8/2001 |
|---|---|---|
| WO | WO 01/92749 A | 12/2001 |
| WO | WO 03/050430 A | 6/2003 |

OTHER PUBLICATIONS

International Search Report, dated Jul. 8, 2004 (2 pages).

* cited by examiner

*Primary Examiner*—Melanie Torres
(74) *Attorney, Agent, or Firm*—St. Onge Steward Johnston & Reens LLC

(57) ABSTRACT

The present invention concerns a disc brake having a caliper encircling one or more brake discs. At least one of said brake discs is received sliding on a hub or a part connected to the hub. According to the invention the caliper is to be mounted in a lagging position. In said lagging position at least a portion of the brake pad assemblies is positioned 0°-180° behind an imaginary point vertically above the centre of a wheel axle, when seen in the normal direction of disc rotation. The invention is intended for brakes, in which the brake pads only act on a restricted part of a full circle.

10 Claims, 2 Drawing Sheets

POSITIONING OF A BRAKE CALIPER

This application is a continuation of pending International Patent Application No. PCT/SE2004/000646 filed on Apr. 27, 2004, which designates the United States and claims priority of Swedish Patent Application No. 0301249-9 filed on Apr. 29, 2003.

FIELD OF THE INVENTION

The present invention concerns disc brakes. Especially it concerns the behaviour of the brake in a released condition.

Disc brakes normally either have a fixed caliper or a sliding caliper. The present invention is directed to disc brakes having a fixed or sliding caliper and one or more brake discs, of which at least one is sliding. The present invention concerns disc brakes in which the brake pads only are to act on a restricted part of a full circle. ("Teilbelag") There are also brakes in which the brake pads act on almost a full circle along the brake discs. ("Vollbelag") The present invention could not be implemented with the latter type of brakes.

PRIOR ART

Sliding brake discs are normally received on a sleeve, hub or the like by means of teeth, splines or the like, or by any other means giving a fixed connection in rotational direction but a sliding connection in axial direction. The hub, sleeve etc. is received on and connected to the wheel axle. Depending on type and make of the brake the brake disc may either be received on a sleeve on the hub, connected to the wheel axle, or the brake disc may be received directly on the hub, without the use of any sleeve. In order to give sliding there has to be a certain play between the teeth, splines or the like on the inner circumference of the brake disc and the teeth, splines or the like on the outer circumference of the hub or sleeve.

In a released condition the disc is free to move in axial direction to some extent.

If, in released condition, the brake disc is put in an inclined position in relation to the rotational axis of the hub or sleeve, the disc will be translated in an axial direction by influence of wheel rotation. The direction of travel is dictated by the direction of the inclination and the direction of wheel rotation. Inclination of a brake disc in released condition is inevitable and occurs randomly in most brakes of this type. The maximal inclination of each brake disc is generally limited either by the distance between the brake pads on both sides of the brake disc or the play in the teeth or splines connection. The brake disc may normally travel until it comes into contact with a brake pad. Such a contact between brake pad and brake disc in a released condition causes an unwanted braking action when the wheel rotates normally called dragging. Dragging may not lead to any serious problems regarding the driving of the vehicle, however, heating of the disc and brake pad, wear of pad and disc, extra energy consumption etc. may occur. Thus, the longevity of the brake pads, and possibly the brake as such, may be negatively influenced by dragging.

In the contact with the brake pad in the released condition there is a risk that the brake disc may be locked in a position in direct contact with the brake pad. This effect is often referred to as self-locking. The driver will not observe when the brake is applied by self-locking, and it may lead to serious damages of the brake and possibly the wheel assembly. Furthermore, if a brake is applied suddenly and unexpected by self-locking it may lead to a hazardous situation. The risk of self-locking may be influenced by a number of factors, such as the radial play between hub and disc, the distance between the brake pads, the position of the brake pads, the rotational direction of the hub etc.

If and as soon as the brake disc is in a vertical position, i.e. in right angles to the sleeve or hub, it may not travel axially along the hub or sleeve.

SUMMARY OF THE INVENTION

One object of the present invention is to hinder or at least reduce the risk that dragging occurs. Furthermore, the risk of self-locking in a released condition should also be avoided or at least reduced.

One part of the present invention is the understanding that the risk of dragging should not be ignored.

According to the present invention the caliper or more precisely the brake pads are positioned to automatically reduce the inclination of the brake discs, without the risk of dragging.

In one aspect of the present invention the maximal inclination of the brake discs in relation to the wheel axle, is limited by the distance between each brake disc and adjacent brake pads. By such an arrangement certain benefits are achieved.

DETAILED DESCRIPTION OF PREFERRED EMBODIMENTS

As used in this description the expressions "axial", "radial" and similar expressions are in relation to a wheel axle associated with the brake.

Figure 1:
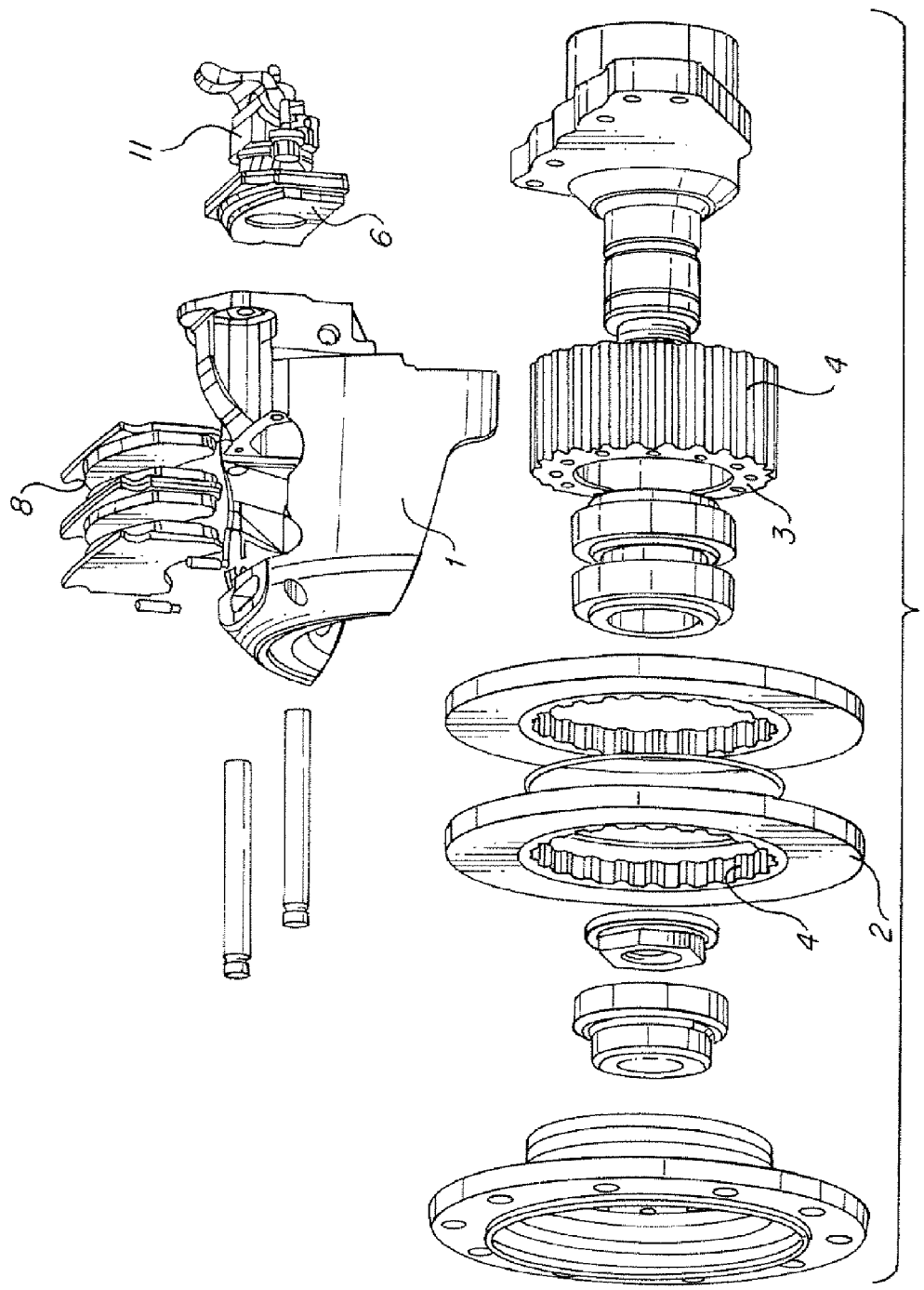
FIG. 1 is an exploded view of one example of a disc brake.

In FIG. 1 one example of a disc brake is shown. A person skilled in the art realises that the principals of the present invention apply for disc brakes having many different structures. Only parts important for the understanding of the present invention will be specifically referred to in the description below.

The disc brake as shown has a caliper 1 surrounding two brake discs 2 received on a hub 3. The brake discs 2 have splines 4 on an inner circumference, which splines 4 are to mesh with splines 4 on the outer circumference of the hub 3. Brake pads 8 are received slidable in the caliper 1 in a normal way. The brake pads 8 are applied by means of a thrust plate 6 and a brake mechanism 11, received in the caliper 1. Braking torque is transferred from the discs 2 to the hub 3, and thus the wheel, by means of the splines 4 or teeth of the brake discs 2 and hub 3, respectively.

In the present description and in the enclosed claims the expression "brake pad assembly" is sometimes used, which expression is intended to cover the brake pads, including brake lining material, back plate, thrust plate, guiding means and/or support means. As used here the expressions "friction area", "surface area" and similar expressions, refer to the parts of the pads in connection with the brake disc(s) during braking.

By means of the splines 4 the discs 2 are received giving a fixed connection in rotational direction but a sliding connection in axial direction. In order for the disc to be able to move axially there must be a play in the splines contact between the disc 2 and the hub 3. This play, in combination with gravity, will give the disc 2 a position with its centre somewhat lower than the centre of the hub 3, when the brake is released. This vertical displacement of the disc 2 concentrates the points of contact between the disc 2 and the hub 3 to the upper part of their interface. The rotation of the hub 3, originating from the wheel, is transferred to the disc 2 by means of these points of contact. Thus, the driving forces are concentrated to the upper part of the interface. In the lower part of the interface between disc 2 and hub 3 there is no point of contact between disc 2 and hub 3 in the released condition of the brake. This is true in the released condition independent of if the brake disc 2 inclines or not. This could be referred to as a rolling contact type, i.e. the points of contact appear between changing pairs of splines 4 on the disc 2 and the hub 3, respectively, during rotation.

In other embodiments (not shown) other number of discs 2 are used and one disc 2 may be fixed in axial direction. Brake pads 8 are placed on both sides of each brake discs 2. Also the brake pads 8 are received moveable in axial direction in the caliper 1, even though the brake pad 8 furthest from the thrust plate may be fixed. During braking the brake mechanism 11 will press the thrust plate 6 against the adjacent brake pad 8, which will be pressed against the brake disc 2 and so on. Braking will occur as the brake pads 8 and brake discs 2 are pressed against each other.

Figure 2:
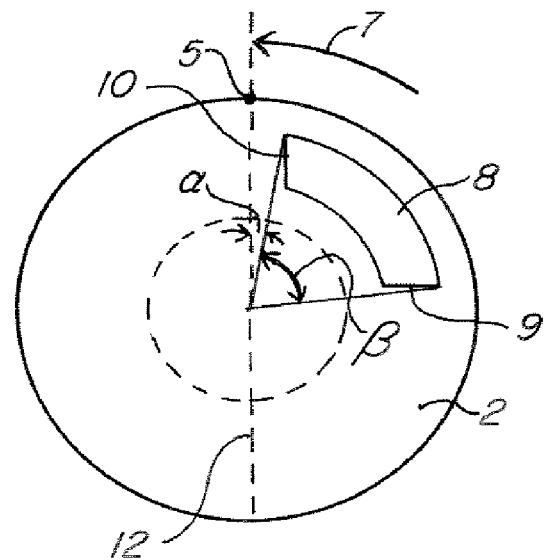
FIG. 2 is a principal sketch illustrating the position of a caliper in relation to a brake disc.

The brake pads 8 have circumferential extensions, which are only parts of a full circle, preferably less than 180°. A person skilled in the art realises that the exact form of the brake pads may vary, without influencing the invention as such. The position of each brake pad 8 or brake pad assembly in relation to the brake discs 2 will influence the risk of dragging. In FIG. 2 an imaginary point 5 is shown on the top of the brake disc 2. Said imaginary point 5 is placed vertically above the centre of the wheel axle, and at the outer periphery of the brake disc 2. The imaginary point 5 represents the angular position of the action point of the resultant driving forces from the hub 3 on the disc 2 when the brake is released. This is due to the fact that the points of contact are placed at the upper part of the interface between disc 2 and hub 3, as described above. The caliper 1, and, thus the brake pads 8 or at least a predominant portion of the friction area of the brake pads 8, is placed in such a position that the pads are placed 0° to 180° behind (to the right as seen in FIG. 2) the imaginary point 5, when seen in the direction 7 of disc rotation. In this description, said position of the caliper 1 is referred to as a "lagging position". Correspondingly if the caliper 1 is placed with the pads 0° to 180°, or at least a predominant part of the friction area of the brake pads 8, before (to the left as seen in FIG. 2) the imaginary point 5 in the direction 7 of disc rotation, said position is referred to as a "leading position".

By placing the predominant part of the friction area of the pads 8 or the brake pad assembly in the lagging position, a major portion of a surface area of the pads 8 acts on the disc 2 in the region of the lagging position which serves to reduce dragging. Preferably, greater than 75% of the surface area of the pads 8 acts on the disc 2 in the lagging position to reduce dragging. Most preferably, nearly all of the surface area of the pads 8 acts on the disc 2 in the lagging position to reduce dragging. It is understood that due to application or other engineering considerations, such as for example, space constraints on some axles and in some vehicles, it may not be possible for the entire surface area of the pad 8 to act in the lagging position of the disc 2, but this does not negate the invention.

The shown direction 7 of disc rotation is when the vehicle is driven in forward direction. If the vehicle is driven in reverse the brake disc 2 will rotate in the opposite direction.

In relation to the direction 7 of rotation of the discs 2 the brake pads 8 have a front edge 9 and a trailing edge 10. As used in this description the front edge 9 is the first part of the brake pad 8 one would encounter if one were placed on the rotating brake disc 2, rotating in the direction of the arrow 7 of FIG. 2.

Figure 3:
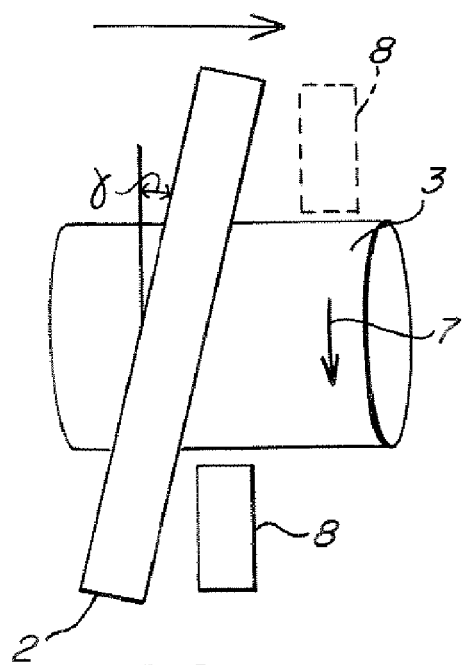
FIG. 3 is a principal sketch used to explain how dragging may occur and showing the brake from above.

When the brake is released there is a distance between each brake disc 2 and adjacent brake pads 8. In order for the discs 2 to be able to move axially there must be a play in the splines contact between the discs 2 and the hub 3. If a disc 2 is inclined $\gamma$ in relation to the rotating hub 3 it will move axially. The axial movement is a consequence of that the interaction between disc 2 and hub 3 is of the rolling contact type, leaving the inclination unaffected by the rotation itself. Experimental rotation of a disc 2 and hub 3 shows clearly that the inclination does not change and that the disc 2 moves axially. Said axial translation of the brake disc 2 is indicated in FIG. 3. The possible maximal inclination $\gamma$ is limited by several factors, such as the axial distance between the brake disc 2 and adjacent brake pads 8 or the play between the splines 4 of the brake disc 2 and hub 3, respectively. In FIG. 3 the caliper 1 and thus the brake pads 8 are shown with continuous lines in a leading position and shown with broken lines in an alternative lagging position, considering the shown direction 7 of rotation. With the caliper 1 positioned in a leading position, the brake disc 2 will be given a force component acting to keep the disc 2 in the inclined position when the disc 2 hits the brake pads 8. However, if the caliper 1 or more precisely the brake pads 8 are placed in a lagging position, as indicated with broken lines in FIG. 3, the brake disc 2 will be given a force component acting to straighten the disc 2 when it hits the brake pad 8 and a friction force appears on the disc 2. This is because the friction force from the pad 8 acts behind (as understood from FIG. 2) the rotational driving force from the hub 3. The above, i.e. the straightening of the disc 2, is also working if the brake disc 2 inclines in the opposite direction to what is shown in FIG. 3. Then the disc 2 will move axially to the left in the picture instead, but still the disc 2 will be straightened as the friction force from the pad 8 on that side of the disc 2 also acts behind the driving force from the hub 3. As mentioned earlier the resultant rotational driving force from the hub 3 acts in the upper part of the interface between disc 2 and hub 3. The straightening of the disc 2 will thus reduce the inclination $\gamma$.

Thus, in order to hinder dragging, or even worse self-locking, according to the present invention the inclined disc 2 will be straightened by means of positioning of the brake pads 8 or brake pad assemblies. As the position of the brake pads 8 or brake pad assemblies are dictated by the position of the caliper 1 one could also say that it is the positioning of the caliper 1, which assist in straightening of the brake disc 2. Thus, when an inclined disc 2 comes into contact with one brake pad 8 or brake pad assembly in released condition, the brake disc 2 will be straightened. A straight brake disc 2, i.e. without inclination ($\gamma=0°$), will not move axially and thus no dragging will occur.

It can be shown that with the caliper 1 placed in a lagging position, as defined above, the risk of dragging is significantly reduced compared to if the caliper 1 is placed in a leading position. To be more exact it is not the position of the caliper 1 as such, but the position of the brake pads 8 or brake pad assemblies that are of importance. However, for in principal all brakes the position of the caliper 1 coincides with the position of the brake pads 8. In order to guarantee the desired effect at least some part of the brake pad assembly should be placed at least a small distance behind an imaginary line going through the centre of the axle and the imaginary point 5.

In FIG. 2 an imaginary line 12 is placed going through the centre of the axle and through the imaginary point 5 at the top of the brake disc 2. An angle α between the imaginary line 12 and the trailing edge 10 of the brake pad 8 is shown, as is an angle β between the imaginary line 12 and the front edge 9 of the brake pad 8. The angle α should be >0° and the angle β should be <180°. In a preferred embodiment the angle α is between 0° and 180°, preferably between 0° and 135° and most preferred between 0° and 90°. The angle β is between 0° and 180°, preferably between 45° and 180° and most preferred between 90° and 180°.

As stated above the maximum inclination of the brake discs 2 in a released condition is either dictated by the clearance between the brake pads 8 and the brake discs 2 or by the play (clearance) in the connection between hub 3 and brake discs 2 or by combinations of these and/or other factors known to those of skill in the art. In the first case one may refer to a disc 2 guidance from the pads 8. In analogy therewith the latter case may be referred to as disc 2 guidance from the splines 4 (teeth). By using guidance from the pads 8 there are certain benefits. One benefit is that there is no need for particular guiding devices or wide disc centres to get disc guidance from the connection with the hub 3. This will save weight and avoiding the risk that the brake disc 2 will be jammed due to locking of the splines or teeth of the hub 3 (sleeve) and brake disc 2, respectively. Furthermore, there is no need for close tolerances in splines (teeth) manufacturing. Thus, there will be a simplified and effective manufacture of disc 2 and hub 3.

What is claimed is:

1. A disc brake having a calliper receiving one or more brake pads and encircling one or more brake discs, of which at least one brake disc is received sliding on a hub or a part connected to the hub, which hub is received on a wheel axle, which one or more brake pads are parts of brake pad assemblies, characterized in that the caliper being mounted so that at least a portion of the brake pad assemblies is positioned 0-180° behind an imaginary point vertically above the centre of the wheel axle, when seen in the normal direction of disc rotation and that in a released condition of the disc brake, points of contact between the disc and the hub or the part connected to the hub are concentrated to an upper part of their interface thereby defining a rolling contact.

2. The disc brake of claim 1, characterized in that a predominant proportion of the surface area of the brake pads are positioned behind the imaginary point.

3. The disc brake of claim 1, characterized in that at least 50% of the surface area of the brake pads are placed in a lagging position.

4. The disc brake of claim 1, characterized in that at least 75% of the surface area of the brake pads are placed in a lagging position.

5. The disc brake of claim 1, characterized in that 100% of the surface area of the brake pads are placed in a lagging position.

6. The disc brake of claim 1, characterized in that an angle (α) between a trailing edge of the brake pads, taken in the direction of disc rotation, and a vertical line going through the centre of the wheel axle and said imaginary point of the brake disc is between 0° and 180°.

7. The disc brake of claim 1, characterized in that an angle (β) between a front edge of the brake pads, taken in the direction of disc rotation, and a vertical line going through the centre of the wheel axle and said imaginary point of the brake disc is between 0° and 180°.

8. The disc brake of claim 1, characterized in that a maximal angle (γ) between the rotational axes of the wheel axle and the brake disc is limited by the clearance between the brake disc and adjacent brake pads.

9. The disc brake of claim 1, characterized in that an angle (β) between a trailing edge of the brake pads, taken in the direction of disc rotation, and a vertical line going through the centre of the wheel axle and said imaginary point of the brake disc is between 0° and 90°.

10. The disc brake of claim 1, characterized in that an angle (β) between a front edge of the brake pads, taken in the direction of disc rotation, and a vertical line going through the centre of the wheel axle and said imaginary point of the brake disc is between 90° and 180°.

* * * * *